United States Patent [19]
Umeda et al.

[11] Patent Number: 5,119,235
[45] Date of Patent: Jun. 2, 1992

[54] FOCUSING SCREEN AND METHOD OF MANUFACTURING SAME

[75] Inventors: Toshiro Umeda, Matsudo; Hiroyuki Sugimura, Yokohama; Shinichi Tsukada, Toride; Noboru Yoneya, Yokohama; Akira Adachi, Machida; Asaji Masuko, Fujisawa, all of Japan

[73] Assignee: Nikon Corporation, Tokyo, Japan

[21] Appl. No.: 630,082

[22] Filed: Dec. 19, 1990

[30] Foreign Application Priority Data

Dec. 21, 1989 [JP] Japan .................. 1-331535
Jun. 28, 1990 [JP] Japan .................. 2-171173

[51] Int. Cl.$^5$ .............................. G03B 3/00
[52] U.S. Cl. .................. 359/619; 359/741; 359/831; 354/200
[58] Field of Search ......... 359/569, 619, 707, 791, 359/831, 837; 354/152, 200

[56] References Cited

U.S. PATENT DOCUMENTS

| | | | |
|---|---|---|---|
| 4,338,012 | 6/1982 | Matsumura et al. | 359/837 |
| 4,352,547 | 10/1982 | Sasaya | 354/200 |
| 4,421,398 | 12/1983 | Suzuki et al. | 359/741 |
| 4,567,123 | 1/1986 | Ohtaka et al. | 430/4 |
| 4,982,214 | 1/1991 | Matsui | 354/200 |

FOREIGN PATENT DOCUMENTS

| | | |
|---|---|---|
| 54-83846 | 7/1979 | Japan . |
| 55-90931 | 7/1980 | Japan . |
| 58-60642 | 4/1983 | Japan . |
| 59-208536 | 11/1984 | Japan . |
| 63-221329 | 9/1988 | Japan . |

Primary Examiner—Bruce Y. Arnold
Assistant Examiner—J. P. Ryan
Attorney, Agent, or Firm—Shapiro and Shapiro

[57] ABSTRACT

A focusing screen of the type composed of a multitude of micro-lens-like curved surfaces arranged on a given plane is substantially regular in terms of their two-dimensional arrangement on the above-mentioned plane but exhibits some variation in terms of the height of the microscopic surface roughness formed by the micro-lens-like curved surfaces. The variation range is determined in correspondence with the pitch of the above-mentioned two-dimensional arrangement. Also disclosed is a method of manufacturing a focusing screen exhibiting an appropriate degree of randomness in terms of its surface configuration.

6 Claims, 13 Drawing Sheets

FOCUSING SCREEN AND METHOD OF MANUFACTURING SAME

BACKGROUND OF THE INVENTION

1. Field of the Invention

This invention relates to a focusing screen for effecting focusing in a camera or the like.

2. Related Background Art

Various types of focusing screens for single-lens reflex cameras have conventionally been used. One type of focusing screen known is obtained in the following manner: the surface of a base material such as glass is roughened through graining to prepare a focusing-screen matrix, from which a mold is prepared. A focusing screen can be produced by transferring this surface roughness onto the surface of a plastic material. Apart from this, Japanese Patent Laid-Open No. 58-60642 discloses a focusing screen, in which the rugged portions on the grainy surface obtained through graining are processed into a spherical configuration, thereby attaining an improvement in diffusion characteristic.

These conventional focusing screens are estimated high in terms of the naturalness in the blur they provide. On the other hand, when used with a lens having a relatively low transmittancy, or, even with a high-transmittancy lens, when stopped down, these focusing screens exhibit a rough graininess on the screen surface as if interspersed with fine sand, resulting in a rather poor visibility. This is attributable to the fact that a surface obtained through graining or a surface obtained by surface-finishing such a surface a microscopic surface roughness, with both the grain size and the height thereof being irregular. Further, such a surface exhibits a very high degree of randomness in terms of grain arrangement.

Apart from this a focusing screen structure is proposed in Japanese Patent Laid-Open No. 55-90931, etc. In this structure, micro-lenses having a microscopic surface roughness (in terms of grain size and height) are arranged with perfect periodicity. This focusing screen exhibits no rough graininess, and provides a satisfactory level of brightness as well as excellent visibility. On the other hand, its perfectly periodical structure restricts the diffracted light in a particular direction corresponding to the order of diffraction, resulting in a striped blur, etc. Thus, the blur obtained with this focusing screen is rather unnatural and disagreeable.

Some of the methods of manufacturing focusing screens having such a microscopic surface roughness utilize the well-known technology of photolithography (Japanese Patent Laid-Open No. 54-83846, etc.). In one of such methods, a master masking plate having a microscopic pattern is set in close proximity to or in close contact with the surface of a photosensitive-material layer formed on a substrate. In this condition, the photosensitive material is exposed, thereby forming on the photosensitive-material surface a microscopic surface roughness corresponding to the microscopic pattern on the master masking plate. In another method of this type, the exposed portion is completely removed, and a microsocopic surface roughness corresponding to the microscopic pattern is formed on the substrate surface by etching. Taking the well-known influence of the proximity exposure into consideration, the former method is superior to the latter. The reason for this assertion will be explained below.

In the proximity exposure method, exposure is effected using, for example, a master masking plate having a microscopic surface pattern as shown in FIG. 20 and a substrate whose surface is coated with a photosensitive material and which is spaced away from the master masking plate by a distance $\Delta d$, as shown in FIG. 19. Thus, even when using the same master masking plate, different illuminance distributions can be realized on the photosensitive-material surface by varying $\Delta d$. The influence of this variation in the illuminance distribution on the microscopic surface roughness is far greater in the former method than in the latter. This is why the former method is regarded superior to the latter.

This proximity exposure method, however, has the following problem: assuming that a microscopic surface roughness as shown in FIG. 1A is formed when $\Delta d = 0$, i.e., in the case of close-contact exposure, an increase in the distance $\Delta d$ results in this surface roughness being changed to a microscopic surface roughness as shown in FIG. 1B. As the distance $\Delta d$ increases, the microscopic surface roughness undergoes a change as shown in FIGS. 1C and 1D. The relationship between microscopic surface roughness and diffusion characteristic is subtle. Generally speaking, when the flat portion in the microscopic surface roughness has a relatively large area, for when the difference between vertex and bottom in the microscopic surface roughness is relatively small, the quantity of the small-angle diffused light is large. However, as can be seen from FIGS. 1A to 1D, when $\Delta d$ is small, the difference between vertex and bottom is large but, at the same time, the area of the flat portion is also large, and, by augmenting $\Delta d$, the area of the flat portion can be reduced but, at the same time, the difference between vertex and bottom is also diminished. As is apparent from the above, the proximity exposure method involves a large amount of small-angle diffused light, which makes focusing rather difficult.

This photolithography method can also be applied to the manufacture of a focusing screen having a regular surface roughness as mentioned above by using a master masking plate having a regular microscopic pattern (U.S. Pat. No. 4,567,123). As stated above, however, such a focusing screen with a regular microscopic pattern can only provide rather unnatural blur.

As stated above, an excessive degree of irregularity in the micrsocopic surface roughness of a focusing screen results in a rough graininess, and an excessive degree of regularity in the same results in an unnatural blur. In view of this, methods have been proposed according to which the microscopic surface roughness is endowed with a semi-regularity.

One of such methods is disclosed in Japanese Patent Laid-Open No. 59-208536. This method employs a master masking plate obtained by enlarging by the step-and-repeat method, the area of a reticule pattern with dotted figures in a semi-regular arrangement. However, the step-and-repeat method inevitably involves the problem of joints. If the problem of joints is overcome successfully, there still remains the problem that the macroscopic light and shade or sparseness and denseness in the reticule pattern becomes generally conspicuous when the area of the pattern is enlarged. Furthermore, in the method disclosed in this laid-open patent Application, the dot diameter, the dot center positions, and the inter-dot-center distance in the reticule pattern are determined totally at random by random numbers, which means the above-mentioned rough graininess is likely to appear due to the excessive degree of randomness.

The above problem is solved by a method disclosed in Japanese Patent Ladi-Open No. 63-221329 by the inventor of the present invention, which adopts a semi-regularity in terms of the microscopic surface roughness. This method aims to impart an appropriate degree of randomness to the arrangement of a regular microscopic surface roughness. In this manufacture method, which adopts the photolithography method, a master masking plate is used, on which figures having substantially the same configuration are arranged with a certain degree of variation in terms of their respective center positions with respect to regular periodical lattice points. This method involves no rough graininess due to an excessive degree of randomness. Further, the pattern drawing on such a master masking plate is performed in a state enlarged by several or several tens of times using an electron beam, a laser pattern generator, etc. Afterwards, the pattern is reduced to the master-plate size of approx. 50 mm × 50 mm through reduction exposure. A range of this order, however, allows the pattern drawing to be completed at one time. If not, there is no need for performing step-and-repeat since this method is strictly limited to a regular arrangement of periodical lattice points and allows the drawing to be divided into several stages.

However, a focusing screen obtained by the above-described random-arrangement method involves the following problem: with such a focusing screen, a diffracted ray light of a higher order can be easily eliminated, whereas it is rather difficult to eliminate a diffracted ray of light of a lower order with such a focusing screen. The above-mentioned unnaturalness in the blur is attributable to the diffracted rays of light. In addition, the random arrangement causes sparse and dense areas to be produced in the microscopic surface roughness as shown in FIG. 2. In this dense areas, no difference between vertex and bottom exists in the microscopic surface roughness, whereas the sparce areas contain a relatively large amount of flat portion, with the result that the small-angle diffused light increases, as stated in connection with the proximity exposure method.

SUMMARY OF THE INVENTION

It is an object to this invention to provide a focusing screen which exhibits no rough graininess and which provides excellent visibility, a high degree of brightness, and a satisfactory degree of blur, thereby facilitating the discrimination between in- and out-of-focus states.

To attain this object, the present invention provides a focusing screen whose microscopic surface roughness exhibits an appropriate degree of randomness in terms, particularly, of the height of this surface roughness. The present invention also provides a method of manufacturing such a focusing screen.

In a first aspect of this invention, a focusing screen consisting of a multitude of micro-lens-like curved surfaces that are arranged two-dimensionally in a plate exhibits an appropriate degree of randomness in terms of the height or depth of its microscopic surface roughness. That is, the focusing screen has a configuration as shown in the contour map of FIG. 3 and the sectional view of FIG. 4. A surface roughness obtained by inverting the one shown in these drawings will also serve the purpose. The configuration in that case is shown in the sectional view of FIG. 5.

Specifically, the arrangement position (X, Y) of the center of each of the multitude of micro-lens-like curved surfaces on the above-mentioned plane is defined as a periodical lattice point which is determined by the following equations from the arrangement pitch P and a combination of integers (I, J):

$$X = P \times \{I + 0.25 \times (-1)^J\} \quad (1)$$

$$Y = P \times (J \times \sqrt{3}/2) \quad (2)$$

where the arrangement pitch P is in the range: $8 \mu m \leq P \leq 30 \mu m$.

The height of the center of each of the multitude of micro-lens-like curved surfaces as measured from the above-mentioned plane exhibits a random variation, the variation range $\Delta h$ being determined by a constant H and the above-mentioned arrangement pitch P, as:

$$\Delta h = H \cdot P$$

where the constant H is in the range:

$$0.01 \leq H \leq 0.1 \quad (3)$$

Thus, the height h of the center of each of the multitude of micro-lens-like curved surfaces as measured from the above-mentioned plane can be expressed as:

$$h = h0 + \text{RAND} \cdot \Delta h$$

where h0 is a constant, and RAND is a random variable which ranges from $-0.5$ to $+0.5$.

The reason for making the variation range proportional to the arrangement pitch P is that making the variation range large when the arrangement pitch is small results in the curvature of the micro-lens-like curved surfaces being large, which causes the generation of a rough graininess.

When the variation constant H is smaller than 0.01, the effect of the variation is practically not to be obtained, and, when the variation constant H is larger than 0.1, the surface graininess becomes conspicuous. In view of this, the variation constant H is preferably in the range:

$$0.015 \leq H \leq 0.08 \quad (4)$$

If the arrangement pitch P of the multitude of micro-lens-like curved surfaces is smaller than 8 $\mu m$, the diffraction angle of each order is large, with the result that the scattering characteristic of the focusing screen deteriorates. If the arrangement pitch is larger than 30 $\mu m$, the configuration of the micro-lens-like curved surfaces falls within the visual resolution range, with the result that the arrangement of the micro-lenses on the focusing screen becomes conspicuous, a condition which is not desirable.

When the variation constant H is smaller than the lower limit of equation (3), the variation range in the height or depth of the micro-lens-like curved surfaces is excessively small, so that the diffracted light is restricted to a particular direction corresponding to the order of diffraction, resulting in a rather poor quality in blur such as a striped one. In addition, since the diffracted light of a lower order is intense, it is difficult to discriminate between in- and out-of-focus states. When the variation constant H is larger than the upper limit of equation (3), the variation in the height or depth of the micro-lens-like curved surfaces is excessively large, with the result that the focusing screen is liable to produce graininess like the conventional focusing plate with an irregular roughness arrangement. Thus, in either case, it is difficult to obtain a focusing screen of a satisfactory quality.

In the following, to be explained, with reference to FIGS. 10 to 13, will be the superiority in characteristics of the focusing screen of this invention, which exhibits an appropriate degree of randomness in terms of height (Focusing Screen A), to the conventional focusing screen which exhibits an appropriate degree of randomness in terms of the two-dimensional arrangement (Focusing Screen B, Japanese Patent Laid-Open No. 63-221329) and to the conventional focusing screen which exhibits no randomness in terms of height or two-dimensional arrangement (Focusing Screen C, U.S. Pat. No. 4,567,123).

As stated above, with Focusing Screen C, the diffracted light is restricted in a particular direction, resulting in an unnatural blur, such as a striped. FIG. 10 is a plan view illustrating the diffracted light in that case. FIGS. 11A, 12A, and 13A show the intensity distribution in the diffraction figure resulting when the two-dimensional arrangement, the height or depth, etc. of a certain range of a multitude of micro-lens-like curved surfaces are varied. These drawings show the results of calculation of the intensity distribution of the diffracted light in the angular range measured 30° ($\Theta 30$) from an arbitrary direction ($\theta x$). FIGS. 11B, 12B, and 13B show the case where the above-mentioned "certain range" is enlarged as compared to that in the case shown in FIGS. 11A, 12A, and 13A.

In the case shown in FIGS. 11A and 11B, the micro-lens-like curved surfaces are arranged with perfect two-dimensional periodicity (K=0 when $\Delta/P_0 = K$). This case corresponds to Focusing Screen C. The height of the micro-lens-like curved surfaces is constant (H=0). Thus, the micro-lens-like curved surfaces are arranged in a structure perfectly periodical both two-dimensionally and three-dimensionally, so that, as can be seen, the light distribution is only in the direction corresponding to the order of diffraction. In the case shown in FIGS. 12A and 12B, the irregularity in arrangement is only two-dimensional (K=0.3, H=0). This corresponds to Focusing Screen B. In this case shown in FIGS. 13A and 13B, the arrangement is made with perfect two-dimensional periodicity, and the height of the micro-lens vertexes exhibits a variation range of H×P (H=0.05). This corresponds to the diffraction intensity distribution in Focusing Screen A.

First, the perfectly periodical arrangement shown in FIGS. 11A and 11B will be compared with the arrangement shown in FIGS. 12A and 12B, which exhibits a certain degree of two-dimensional randomness. As will be seen from the drawings, when compared to the case where the arrangement is perfectly periodical, the introduction of a certain degree of two-dimensional randomness into the arrangement of the micro-lens-like curved surfaces results in the peaks of the higher-order diffracted rays of light (n=2, 3, 4) being lower, with peaks appearing also in an intermediate diffraction area where no peak has existed. Thus, the introduction of a certain degree of randomness into the two-dimensional arrangement causes the directivity of the diffracted rays of light by the focusing screen to be made feebler, thereby improving the blur to some degree. In addition, the rough graininess, which is produced in the case of a totally irregular arrangement pattern, is mitigated.

Next, the intensity distribution in the case shown in FIGS. 12A and 12B, where a certain degree of randomness is introduced into the two-dimensional arrangement, will be compared with the intensity distribution in the case shown in FIGS. 13A and 13B, where, in accordance with this invention, a certain degree of randomness is introduced into the distribution in height. As can be seen from FIGS. 13A and 13B, even if the two-dimensional arrangement is perfectly periodical, a certain degree of randomness in terms of the height of the micro-lens vertexes weakens the directivity of the diffracted ray of light, as in the case where the two-dimensional arrangement is made with a certain degree of randomness. Furthermore, while the diffracted rays of light of the 0-th and the first orders are relatively intense in the case shown in FIGS. 12A and 12B, where only the two-dimensional arrangement exhibits a certain degree of randomness, the diffracted rays of light of lower orders (n=0, 1) are obviously far feebler in the case shown in FIGS. 13A and 13B, where the height of the micro-lens-like curved surfaces exhibits a certain degree of randomness. Thus, it is to be appreciated that the problem of the poor quality in blur, which is attributable to the increased quantity of light in the small-angle scattering caused by the lower-order diffracted rays of light, and the problem of the difficulty in discriminating between in- and out-of-focus states (problems involved when the two-dimensional arrangement exhibits a certain degree of randomness) can be solved to some degree by the focusing screen of this invention, which exhibits a certain degree of randomness in height.

In a second aspect of this invention, a certain degree of randomness is adopted in terms of both height and two-dimensional arrangement. With this combination in randomness, this invention aims to solve the problem of the unnaturalness in blur.

Specifically, in the above-mentioned first aspect of this invention, the center of each micro-lens-like curved surface is situated in the vicinity of a periodical lattice point, as shown in FIGS. 7A and 7B. The variation range $\Delta$ is determined from a constant K, which is in the range:

$$0 < K \leq 0.4 \quad (5)$$

and the above-mentioned arrangement pitch P, as:

$$\Delta = K \cdot P$$

When the variation range in the arrangement is large, the problem described in connection with the prior-art example where only the two-dimensional arrangement exhibits a certain degree of randomness occurs, so that it is desirable that the constant K be substantially in the range:

$$0 < K \leq 0.3 \quad (6)$$

By thus introducing a certain degree of randomness in terms of both two-dimensional arrangement and height, the directivity of the diffracted light is further weakened, thereby eliminating the unnaturalness in the blur.

In manufacturing the focusing screen of this invention by photolithography, the pitch $P_0$ of the hexagonal lattice serving as the reference points in the periodical arrangement on the master masking plate is first set as shown in FIG. 6. In the case of 1/1 magnification exposure, the pitch P on the focusing screen is the same as $P_0$. In the case of reduction exposure, they differ from each other.

Specifically, when manufacturing a focusing screen in accordance with the above-mentioned first aspect of this invention, lattice points $Q_1$, $Q_2$, $Q_3$, ... which give a two-dimensional periodical arrangement are determined from equations (1) and (2), and a dot pattern as shown in FIG. 8 is formed. In FIG. 8, the dots corresponding to the hexagonal lattice of FIG. 6 are represented as black spots. When manufacturing a focusing screen in accordance with the above-mentioned second aspect of this invention, points respectively positioned in the vicinity of these lattice points with a slight variation $\Delta$ are determined as shown in FIGS. 7A and 7B, thereby imparting a certain degree of randomness to the two-dimensional arrangement. Using these points as dot centers, a dot pattern as shown in FIG. 9 is formed on the master masking plate. Here, the respective sizes of the dots in the dot pattern are varied in accordance with the respective heights or depths of the micro-lens-like curved surfaces to be formed. By thus providing an appropriate variation range in the dot size, a multitude of micro-lens-like curved surfaces whose respective heights or depths vary within the above-mentioned variation range can be formed.

In the example of the dot pattern shown in FIG. 8, dots whose diameter varies from the maximum $\phi_{min}$ to the minimum $\phi_{max}$ are respectively formed on the periodical hexagonal lattice points determined from equations (1) and (2), thereby preparing the pattern for the master masking plate, whereas, in the example of the dot pattern shown in FIG. 9, dots whose diameter varies likewise from the maximum $\phi_{min}$ to the minimum $\phi_{max}$ are respectively formed using the above-mentioned periodical lattice points, which are determined by using the constant K given from equation (6), as reference points, within the variation range of $(K \times P)$ $\mu$m, thereby preparing the pattern for the master masking plate.

It goes without saying that, whether the micro-lens-like curved surfaces are formed as convex surfaces or concave depends on how the patterning of the master masking plate is made, or whether the photosensitive material is of a negative type or a positive, or how the replica is prepared in the manufacturing process. There is no noticeable difference in characteristic between the two types of curved surfaces, both sufficiently helping to achieve the object of this invention.

In accordance with a third aspect of this invention, there is provided a method of manufacturing a focusing screen which is substantially identical to the focusing screen of the second aspect. This method differs from the above-described second method.

Specifically, when preparing a focusing screen by photolithography, a microscopic surface roughness having an appropriate degree of randomness is previously provided on the surface of the photosensitive material. The microscopic surface roughness (FIG. 18A) obtained after exposure and development is a composite surface roughness consisting of the previously provided microscopic surface roughness and a microscopic surface roughness which would be formed by photolithography if the photosensitive-material surface were flat. The resulting microscopic surface roughness is substantially identical to that of the second aspect of this invention. Of course, the microscopic surface roughness obtained in accordance with the third aspect of this invention differs from the one obtained in accordance with the second aspect in that it exhibits a lower degree of surface roughness and that the configuration of the micro-lens-like curved surfaces undergoes a change. The microscopic surface roughness to be previously formed on the surface of the photosensitive material can be prepared by applying a photosensitive material to a substrate on which a microscopic surface roughness is previously provided by graining or the like.

What should be noted here is that the previously provided microscopic surface roughness alone is not enough in preparing a usable focusing screen. For, the requisite condition for the microscopic surface roughness in this case is that the maximum difference between vertex and bottom be not more than double the above-mentioned $\Delta h$. Such a small difference between vertex and bottom will not result in a rough graininess. On the other hand, it will restrict the diffusion to a very small range.

However, thanks to this diffusion, this method allows the introduction of randomness and the enhancement in diffusibility to be effected at the same time. This constitutes the greatest merit of this method. For, it can eliminate the above-described problem in the photolithography method that the small-angle diffused light increases. Furthermore, with this method, a microscopic surface roughness exhibiting a certain degree of randomness can be formed even when using a master masking plate having a regular pattern with no randomness. Further, this method may be combined with the first and second aspects of the present invention.

BRIEF DESCRIPTION OF THE DRAWINGS

FIGS. 16 to 21 are diagrams illustrating an embodiment in accordance with the second aspect of this invention, of which

FIG. 16 is a sectional view of a substrate having a microscopic surface roughness;

FIGS. 17A and 17B are sectional views of substrates to which a photosensitive material is applied;

FIGS. 18A and 18B are sectional views of a microscopic surface roughness formed on each photosensitive-material surface;

FIG. 19 is an explanatory view illustrating the mask exposure method;

FIG. 20 is an explanatory view illustrating a master masking plate; and

FIGS. 21A and 21B are diagrams each showing a diffusion-characteristic curve.

DETAILED DESCRIPTION OF THE PREFERRED EMBODIMENTS

Embodiments of this invention will now be described.

Figure 1A:
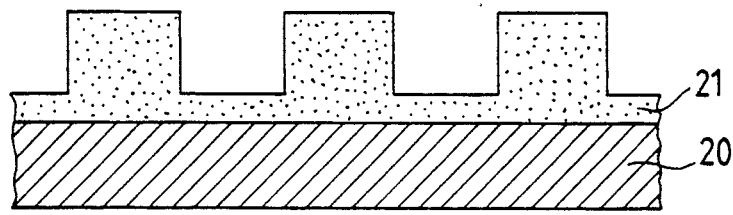
FIGS. 1A to 1D are schematic longitudinal sectional views of a focusing screen, illustrating the configuration of a microscopic surface roughness formed by the conventional mask exposure method and showing the change taking place in the microscopic surface roughness as the distance $\Delta d$ between the mask and the photosensitive-material surface increases.
Figure 1B:
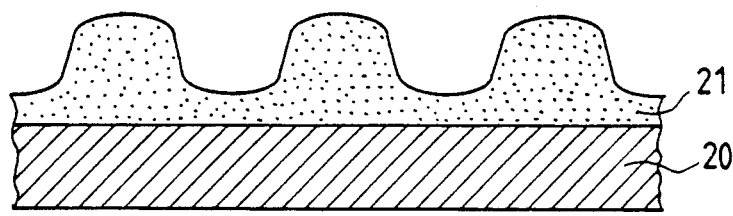
Figure 1C:
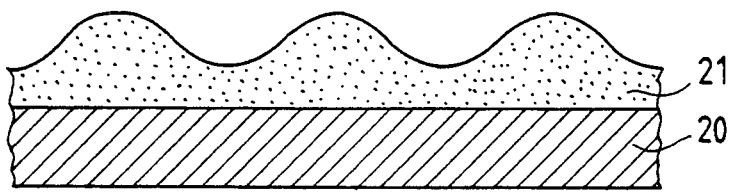
Figure 1D:
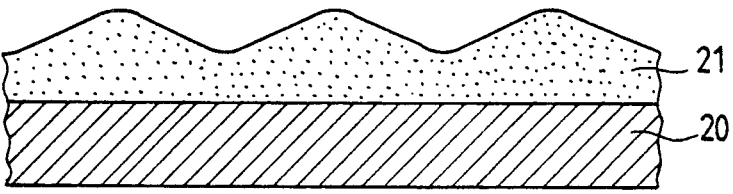
Figure 2:
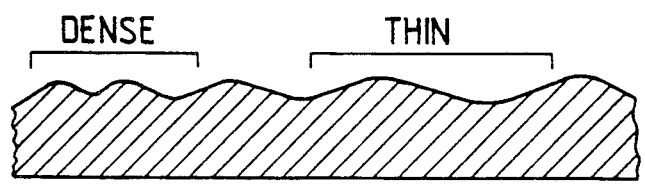
FIG. 2 is sectional view of a prior-art focusing screen whose microscopic surface roughness exhibits an appropriate degree of randomness.
Figure 3:
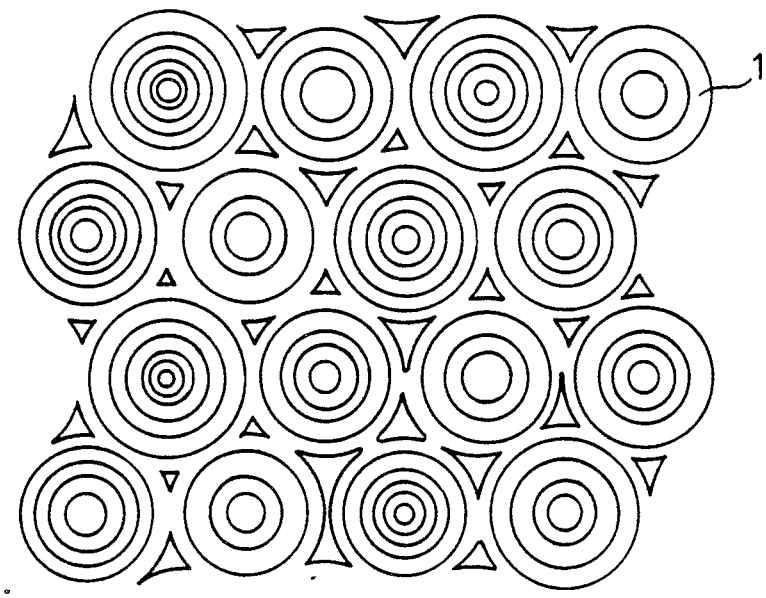
FIG. 3 is a contour map showing an example of the configuration of a multitude of micro-lens-like curved surfaces constituting the microscopic structure of a focusing screen in accordance with the present invention.
Figure 4:
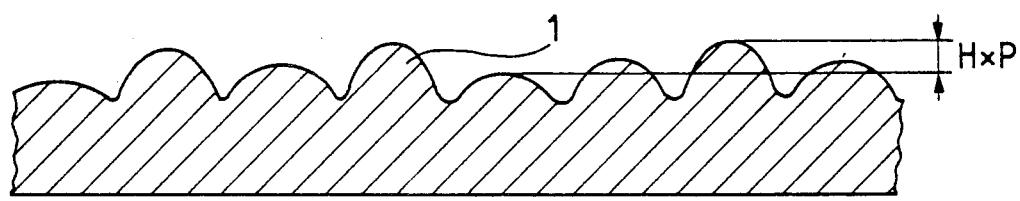
FIG. 4 is a schematic sectional view of a focusing screen where the multitude of micro-lens-like curved surfaces are convex surfaces.
Figure 5:
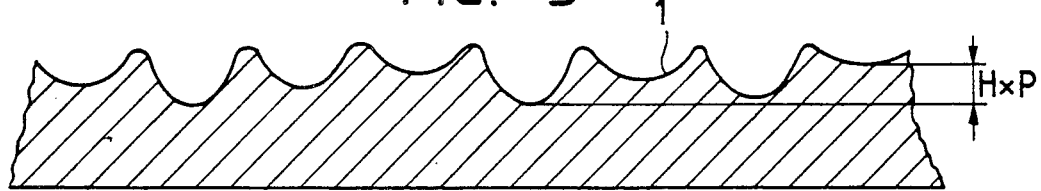
FIG. 5 is a schematic sectional view of a focusing screen where the multitude of micro-lens-like curved surfaces are formed as concave surfaces.
Figure 6:
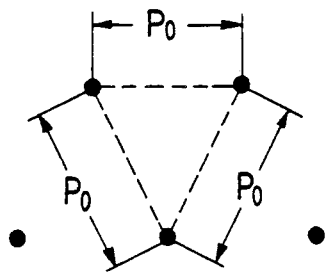
FIG. 6 is a plan view showing the reference points of a two-dimensionally arranged hexagonal lattice formed on a master masking plate.

A first embodiment in accordance with the first aspect of this invention employs a perfectly periodical hexagonal lattice structure as shown in FIG. 6 for the two-dimensional arrangement. This is a closest-packing structure, which exhibits a strong isotropy. The lattice point pitch in this arrangement structure is 20 $\mu$m. A dot pattern is formed by using the lattice points in this periodical arrangement as the dot centers. The diameter $\phi$ of the dots in this pattern, which have a circuit configuration, is varied within the range: 7 $\mu$m $\leq \phi \leq$ 13 $\mu$m. By using a master masking plate thus formed, a 1/1 magnification exposure is effected on photoresist, which is subjected to a recording and development process, thereby forming a multitude of micro-lens-like curved surfaces.

The difference between a focusing screen thus prepared, which exhibits a certain degree of randomness in terms of height (H=0.05), and a conventional focusing screen which exhibits randomness only in the two-dimensional arrangement (K=3) can be appreciated from in FIGS. 13A, 13B, FIG. 12A and 12B, which show the calculation results of the diffracted-light-intensity distribution. As can be seen from these drawings, the directivity in diffraction is relatively weak in the case where a certain degree of random in height is adopted.

Figure 11A:
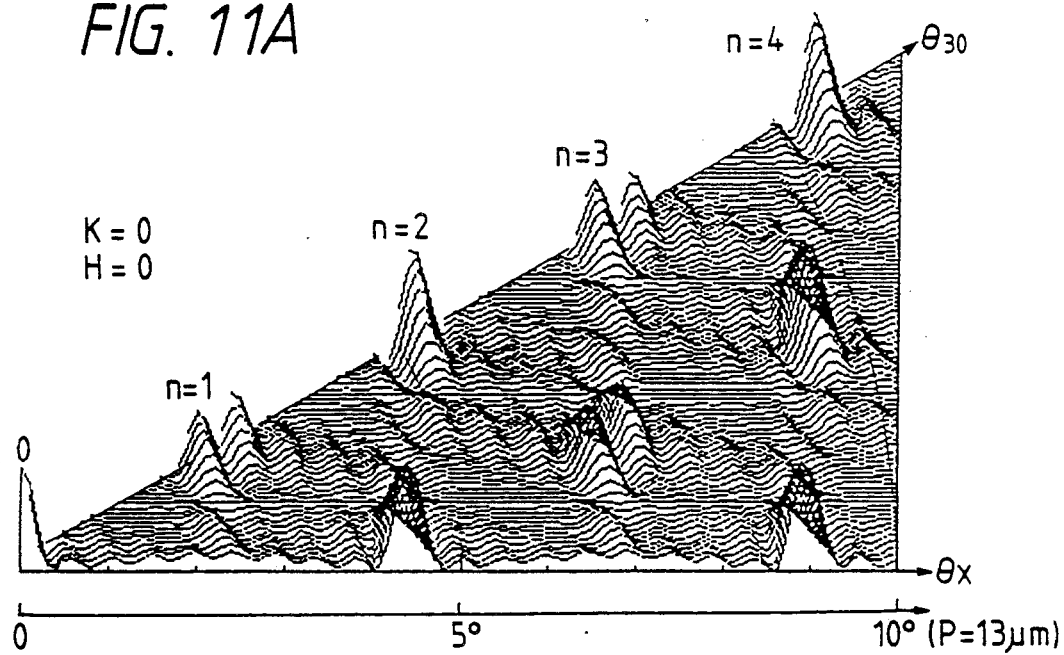
FIGS. 11A and 11B are diagrams illustrating the intensity distribution of the diffracted rays of light in a focusing screen having a totally periodical structure.
Figure 11B:
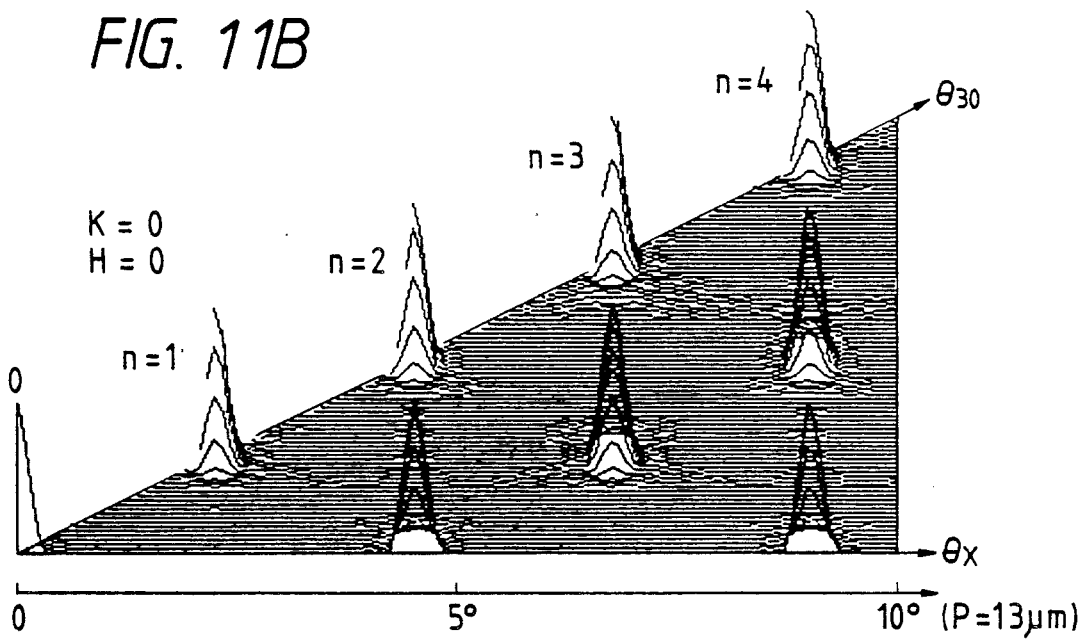
Figure 12A:
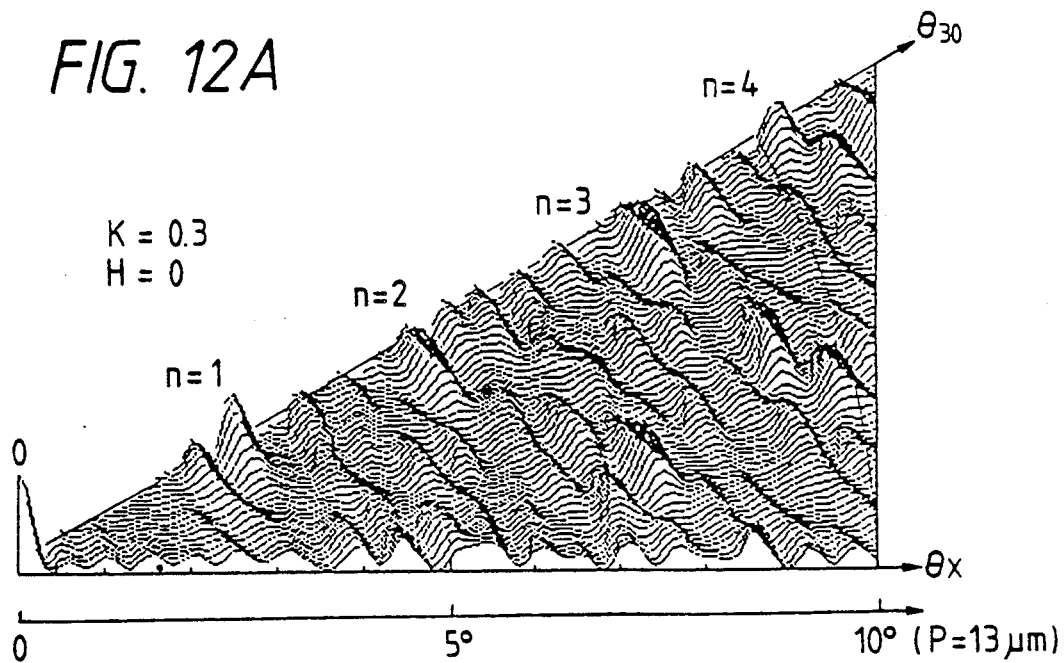
FIGS. 12A and 12B are diagrams illustrating the intensity distribution of the diffracted rays of light in a focusing screen having a structure which exhibits a certain degree of randomness only in terms of the two-dimensional arrangement.
Figure 12B:
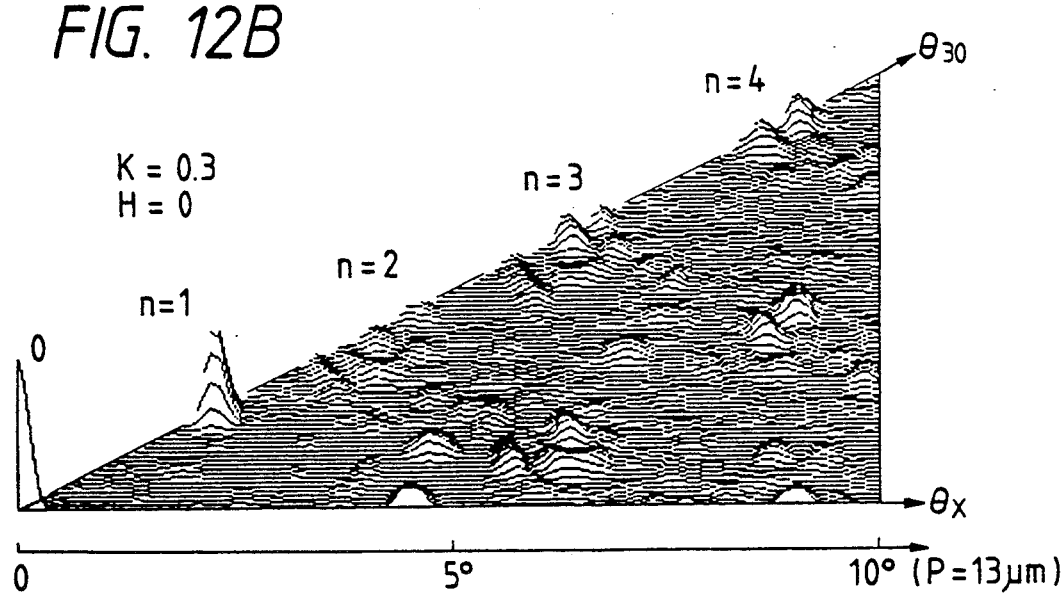
Figure 13A:
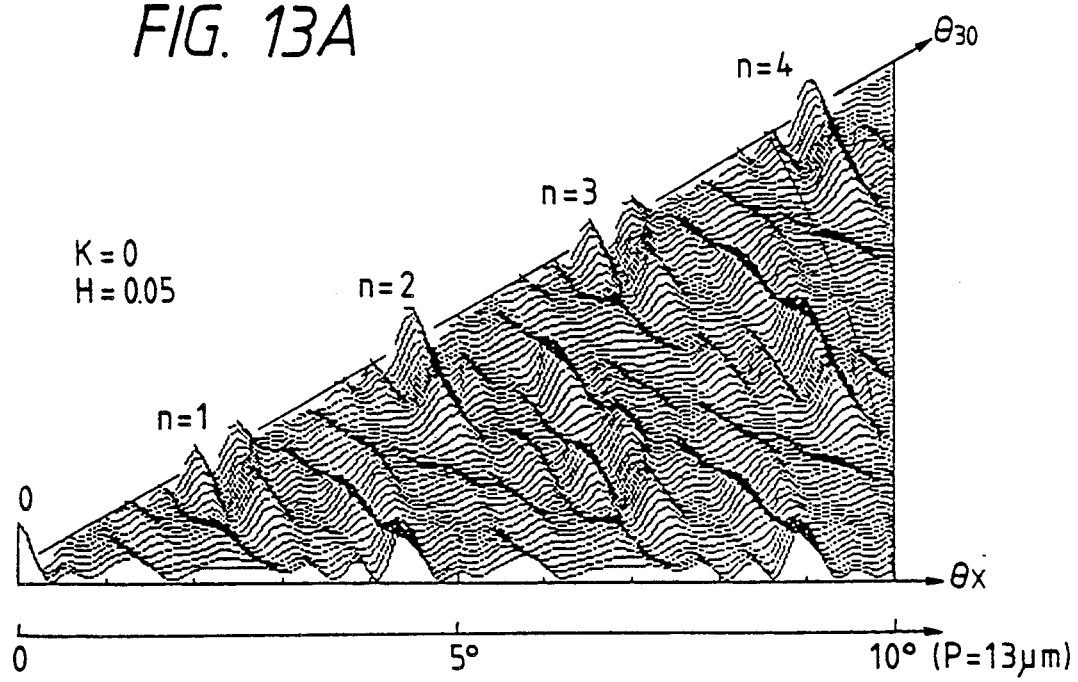
FIGS. 13A and 13B are diagrams illustrating the intensity distribution of the diffracted rays of light in a focusing screen in accordance with a first embodiment of the present invention.
Figure 13B:
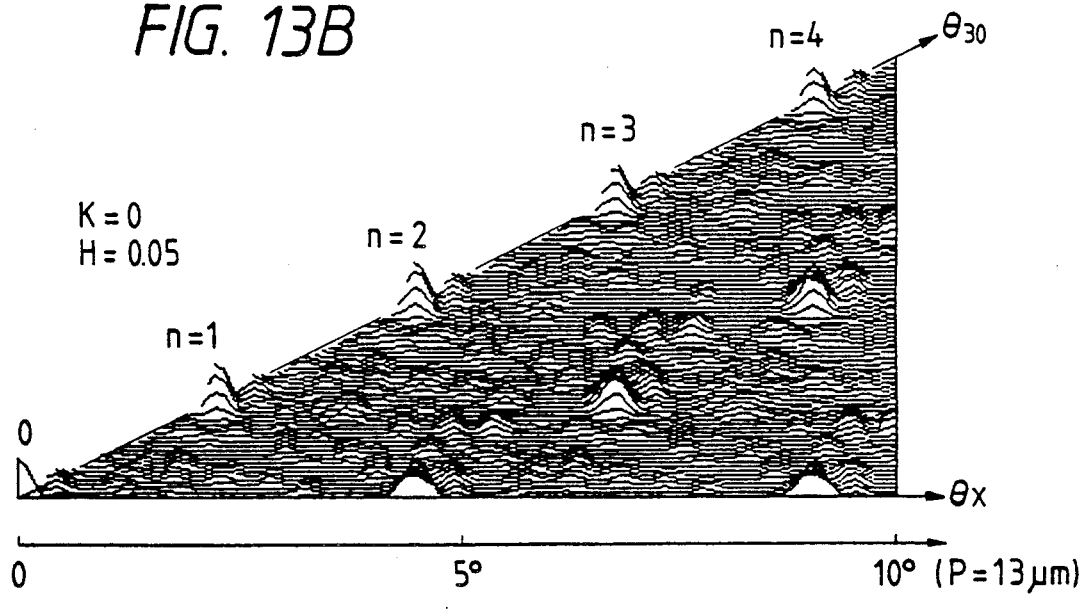
Figure 14:
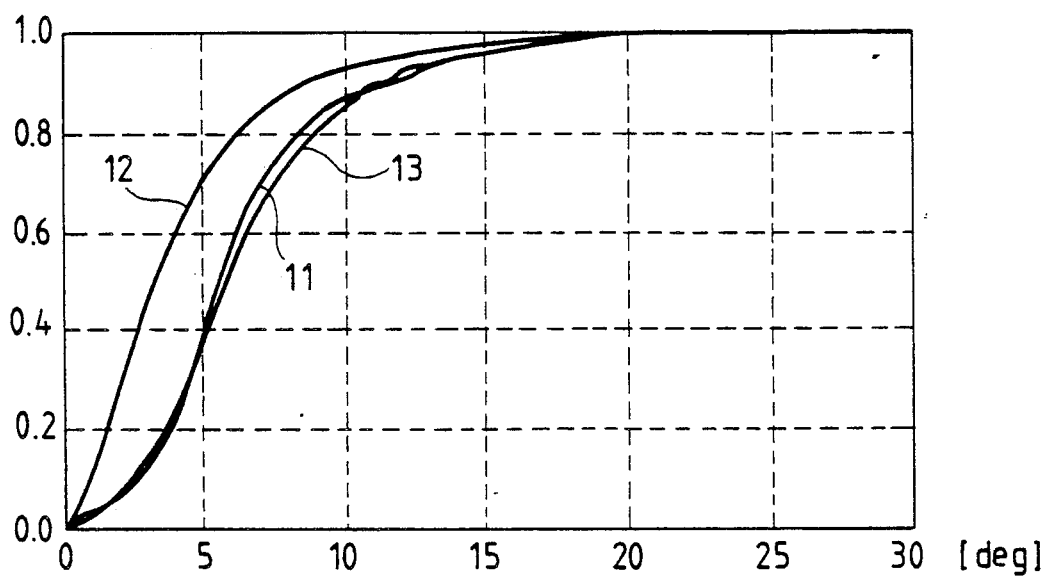
FIG. 14 is a graph showing the rate of the quantity of light diffused in different angles when the total quantity of the diffused light by the focusing screen is represented as 1.

Next, the diffusion characteristic of the focusing screen of the above first embodiment will be compared with that of conventional focusing screens. FIG. 14 is a graph showing the rate of quantity of light diffused within areas corresponding to different angles when the total amount of diffused light by the focusing screen is to be represented by 1. The horizontal axis represents the angle, and the vertical axis represents the respective accumulated quantities of light within the areas corresponding to different angles. The diffusion characteristic 13 of the focusing screen of the first embodiment of this invention, shown in FIGS. 13A and 13B, is such that the quantity of light of small-angle scattering is kept at a relatively low level as compared to the diffusion characteristic 12 of the conventional focusing screen shown in FIG. 12A and 12B, in which a random structure is only adopted in the two-dimensional arrangement. Further, the diffusion characteristic 13 of the focusing screen of this invention obviously exhibits a scattering distribution which is substantially identical to that resulting from the diffusion characteristic 11 of the conventional focusing screen shown in FIGS. 11A, 11B, which exhibits a perfectly periodical structure. Thus, in accordance with this invention, a certain degree of randomness is not introduced into the two-dimensional arrangement. Instead, a three-dimensional randomness, i.e., a randomness in terms of height is adopted, thereby making the diffracted light of a lower order relatively feeble and making it possible to provide a uniform scattering characteristic over an angular range which is wide to some measure. Thus, it will be appreciated that the focusing screen of this invention provides a desirable diffusion characteristic.

Figure 7A:
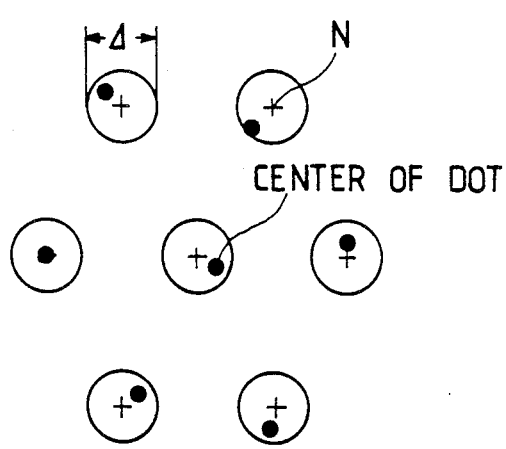
FIGS. 7A and 7B are plan views showing an arrangement pattern example for dot centers, in which each dot center is positioned in the vicinity of a reference point N with a predetermined variation range.
Figure 7B:
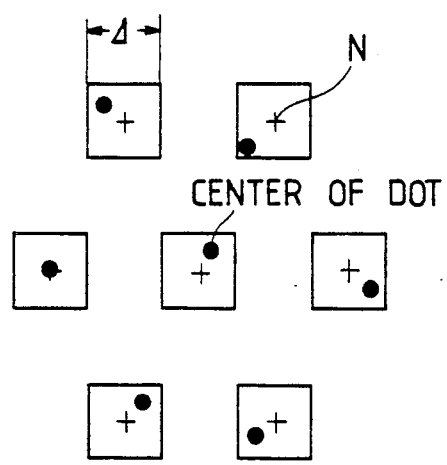
Figure 8:
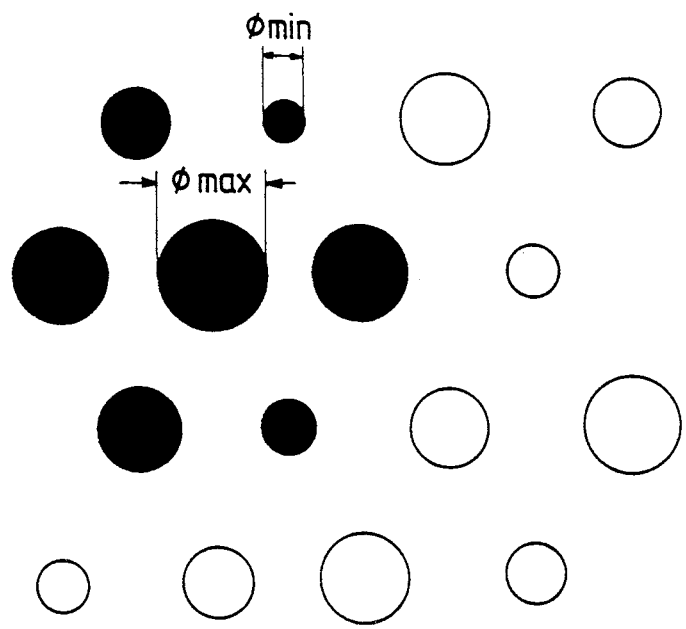
FIG. 8 is a plan view showing an example of the master-mask-plate pattern, which consists of a dot pattern formed by using the periodically arranged lattice points as reference points for the respective dot centers, thereby imparting a certain degree of randomness in terms of height to a multitude of micro-lens-like curved surfaces.
Figure 9:
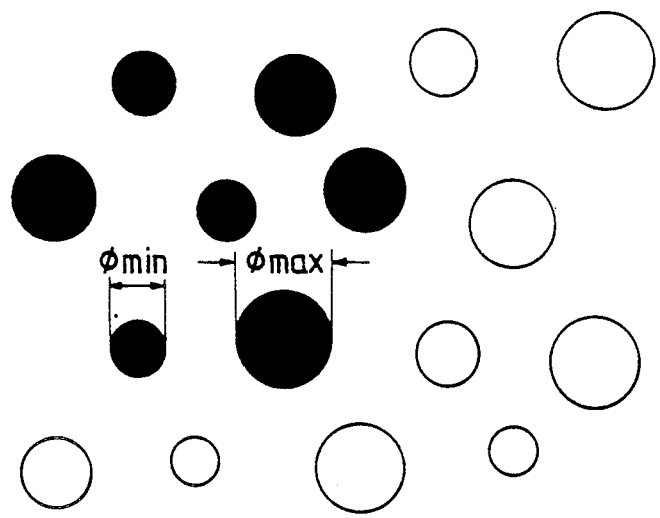
FIG. 9 is a plan view showing an example of the master-mask-plate pattern, which consists of a dot pattern formed by using the centers determined as shown in the example of FIGS. 7A and 7B, thereby imparting a certain degree of randomness in terms of height to a multitude of micro-lens-like curved surfaces.
Figure 10:
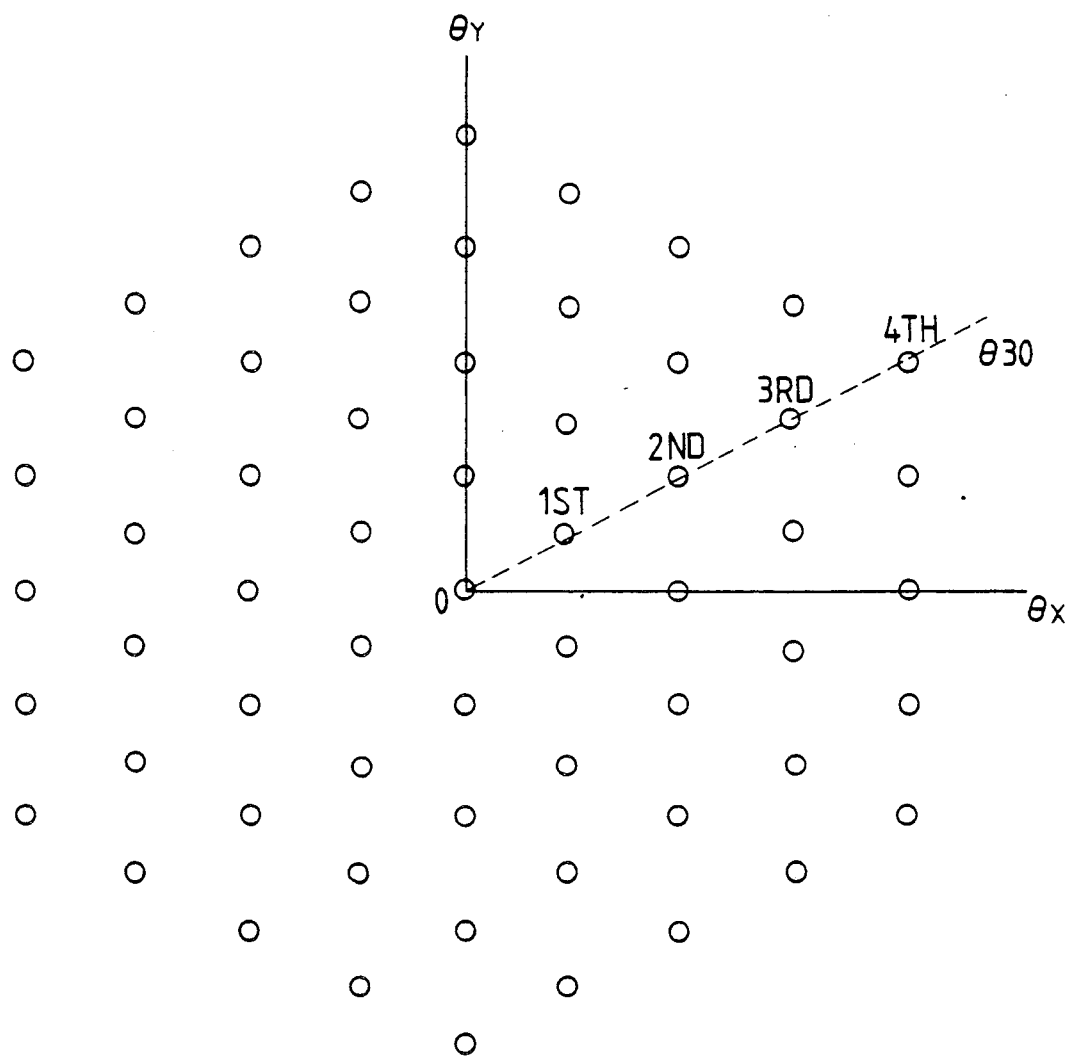
FIG. 10 is a diagram showing the intensity distribution of the diffracted rays of light in the case where a multitude of micro-lens-like curved surfaces are arranged in a totally periodical structure.

In a second embodiment of a focusing screen in accordance with the first aspect of this invention, a slight degree of irregularity is imparted to the two-dimensional arrangement structure in addition to the randomness in terms of height. In this second embodiment, reference points N are first determined. As shown in FIG. 6, the reference points are arranged with perfect periodicity in a hexagonal-lattice-like pattern at a pitch of 20 $\mu$m, and, as shown in FIGS. 7A and 7B, a dot pattern is formed, in which the center of each dot is determined in the vicinity of a reference point with a variation range $\Delta$, which ranges from 0 to 3$\mu$. Then, as shown in FIG. 9, an opening or a shielding having a circular configuration is formed around each dot center, the diameter $\phi$ (ranging from $\phi_{min}$ to $\phi_{max}$) of each opening or shielding being in the range:

8 $\mu$m $\leq \phi \leq$ 12 $\mu$m

Figure 15A:
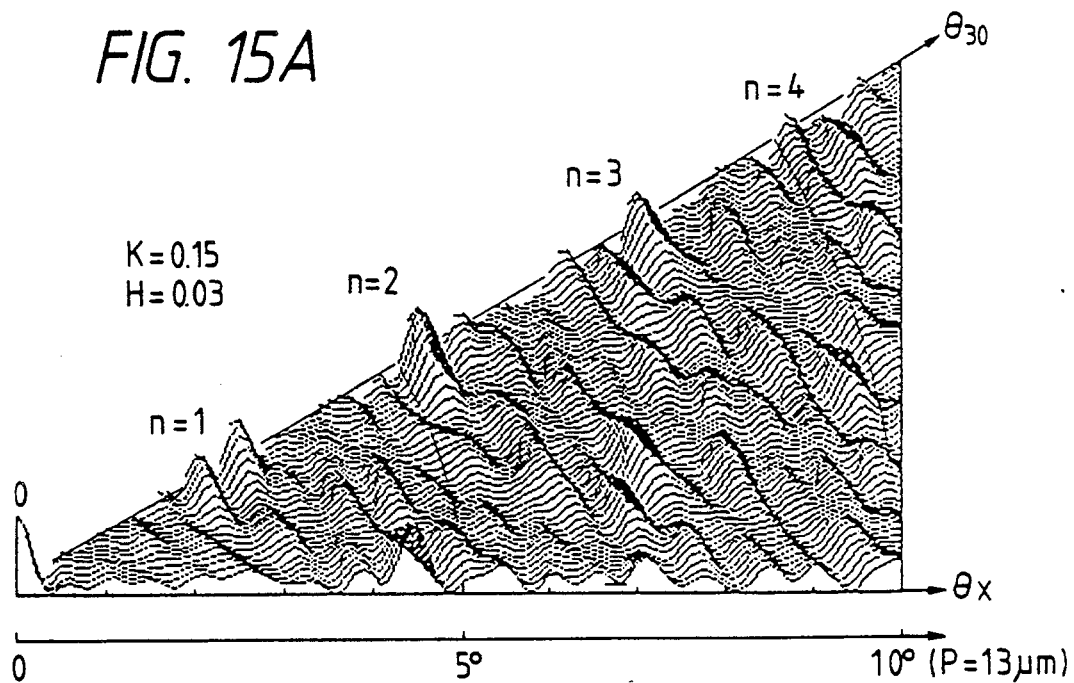
FIGS. 15A and 15B are diagrams illustrating the intensity distribution of the diffracted rays of light in a focusing screen in accordance with a second embodiment of this invention.
Figure 15B:
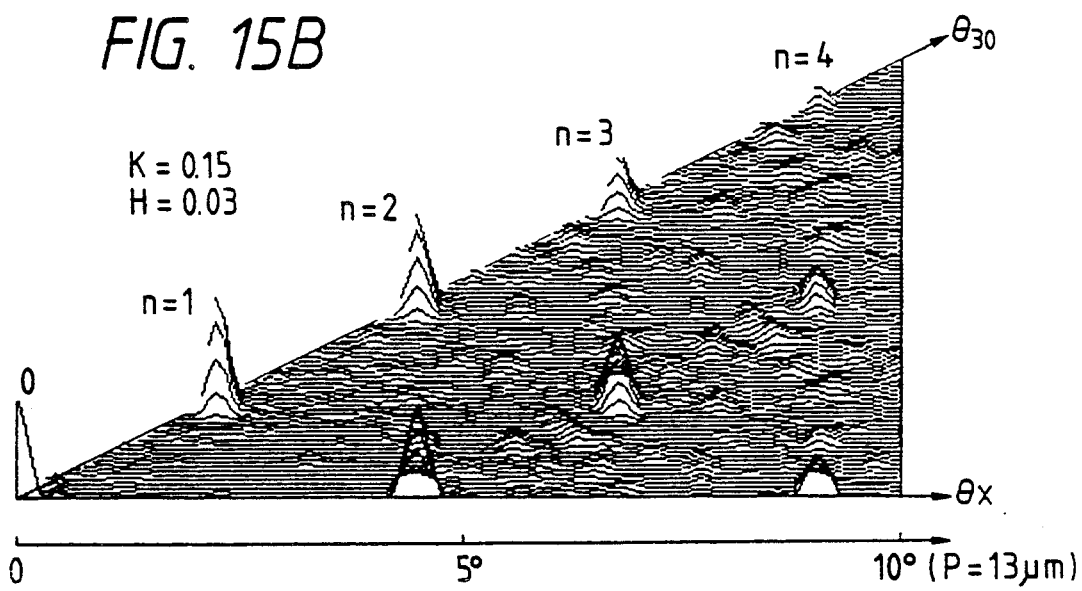

A 1/1 magnification exposure and a recording/development process were performed by using a master masking plate prepared in this way, thereby obtaining a focusing screen exhibiting a slight irregularity in the two-dimensional arrangement (K=0.015) and a certain degree of randomness in the height of the micro-like curved surfaces (H=0.03). FIGS. 15A and 15B show the calculation results of the diffracted-light-intensity distribution of this focusing screen. In this embodiment, as in the first one, the intensity of the diffracted rays of light or lower orders is reduced and the directivity in diffraction is diminished as compared to the perfectly periodical structure shown in FIGS. 11A and 11B or the conventional structure shown in FIGS. 12A and 12B, which exhibits randomness only in the two-dimensional arrangement. Thus, the focusing screen of this second embodiment has a desirable diffusion characteristic. Thus, the introduction of a slight randomness into the two-dimensional arrangement is effective. However, if the degree of irregularity in the two-dimensional arrangement is so high that the value of K exceeds 0.5, the randomness in the arrangement becomes excessive, with the result the effect obtained by the randomness in the height of the micro-lens-like curved surfaces is diminished.

In view of this, the above-mentioned numerical restrictions are prescribed in terms of the distribution of the respective vertex heights of the micro-lens-like curved surfaces, the randomness in the two-dimensional arrangement, etc., thereby making it possible to obtain a focusing screen which provides excellent diffusion characteristic.

The simplest method of manufacturing a focusing screen in accordance with the first aspect of this invention to employ the so-called photolithography. The exposure method to used therein may be the contact exposure method, or the proximity exposure method, in which some gap is provided between the master masking plate and the photoresist surface so as to utilize the out-of-focus state owing to the diffraction effect, the spread of the light source, etc. Further, the exposure does not necessarily have to be made with a 1/1 magnification. A reduction exposure may also be performed. When using photoresist as the photosensitive material, it may be of a positive or a negative type. Alternatively, a gelatin dry plate may also be employed. Further, the configuration of the dots in the dot pattern formed on the master masking plate does not necessarily have to be circular. The reference points for the two-dimensional arrangement do not necessarily have to be arranged in a hexagonal lattice structure. There is no need for restricting their pitch of 20 μm. As described above, it is practical for value of P on the focusing screen to be in the range: 8 μm ≦ P ≦ 30 μm.

Next, the second aspect of this invention will be described in connection with the embodiments shown in FIGS. 16 to 21.

Figure 16:
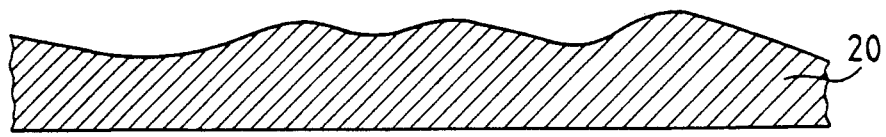

FIG. 16 is a schematic longitudinal sectional view of a substrate 20 used in an embodiment of this invention. This embodiment adopts glass as the substrate material. Graining with an an average grain pitch of 5 to 100 μm was effected on this substrate before a photosensitive material was applied thereto. Afterwards, a microscopic surface roughness was formed thereon keeping the average difference between vertex and bottom not larger than 5 μm.

Figure 17A:
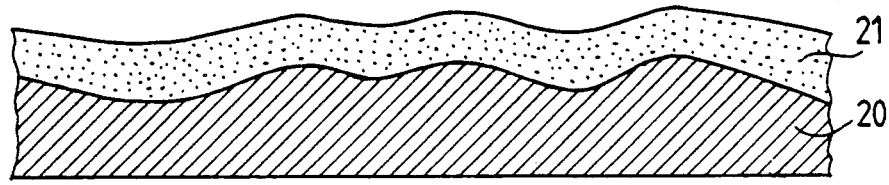
Figure 17B:
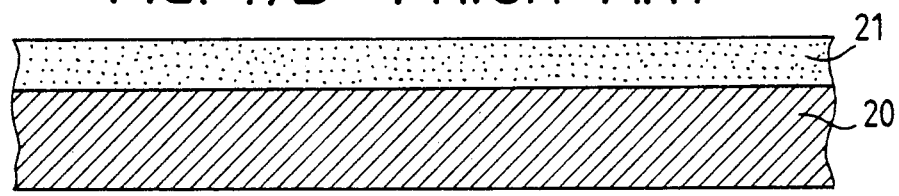
FIGS. 17B, 18B, and 21B show, for comparison, the case where the conventional proximity exposure method is adopted.

FIGS. 17A and 17B are schematic longitudinal sectional views showing the condition where a photosensitive material 21 has been applied to the substrate 20. FIG. 17A shows the substrate of this embodiment having a microscopic surface roughness, and FIG. 17B shows a conventional flat substrate, which is presented here for comparison.

In the embodiment, photoresist of a positive type is adopted as the photosensitive material 21, with spin-coating being effected on the substrate surface. The resulting surface of the photosensitive material 21 exhibits, as shown in FIG. 17A, a microscopic surface roughness which is under the influence of the microscopic surface roughness previously formed on the substrate.

Although in this embodiment spin-coating is effected on the substrate by using photoresist of a positive type as the photosensitive material 21, this should not be construed as respective. The photosensitive material may also be photoresist of a negative type, gelatin dry plate, etc., which may be processed by spray-coating.

Figure 19:
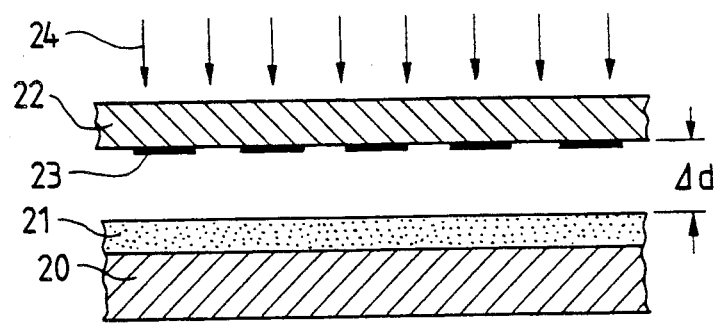

FIG. 19 illustrates the state at which the microscopic surface roughness is exposed on the substrate to which a photosensitive material has been applied.

Referring to FIG. 19, the photosensitive material 21 applied to the substrate 20 is exposed through a master masking plate 22 having a microscopic surface roughness 23 by exposure light 24. Further, in performing the exposure, a gap Δd ranging from 10 to 100 μm is provided between the master masking plate 22 and the substrate 20 coated with the photosensitive material 21.

Figure 20:
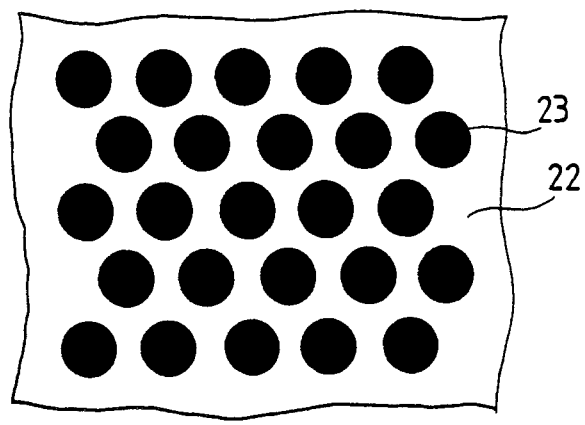

FIG. 20 shows the master masking plate used in the exposure process in this embodiment. This master masking plate comprises circular dot pattern 23 printed on a glass substrate by using chromium. The dots are formed using a multitude of points arranged in a regular periodicity at a pitch of 15 to 30 μm as their respective centers, each dot having a diameter ranging from 5 to 15 μm.

By performing development after the above-described exposure process, a composite microscopic surface roughness composed of the microscopic surface roughness previously formed on the substrate and the microscopic surface roughness obtained through exposure using the master masking plate is formed on the surface of the photosensitive material 21.

Figure 18A:
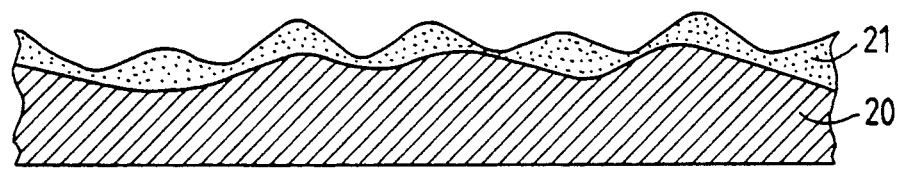
Figure 18B:
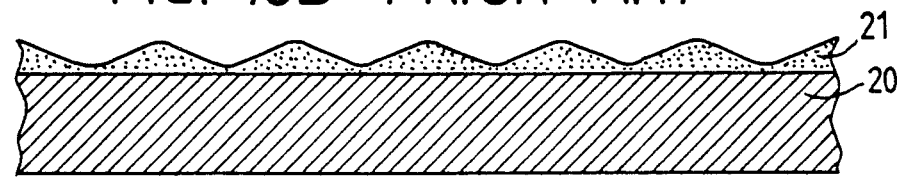

FIGS. 18A and 18B are schematic longitudinal sectional views showing the condition after development of the photosensitive material 21 applied to the surface of the substrate 20. FIG. 18A shows the embodiment, and FIG. 18B a prior-art example to be compared therewith. As is apparent from the comparison, the prior-art example exhibits a regular microscopic surface roughness, whereas the embodiment exhibits a composite surface roughness, which is composed of the surface roughness formed on the surface of the photosensitive material 21 in conformity with the microscopic surface roughness previously formed on the substrate 20 and a microscopic surface roughness newly formed thereon. In this way, focusing-screen matrices were prepared.

As is apparent from the embodiment, an irregular surface roughness (exhibiting randomness) can be formed even when using a master masking plate 22 having a regular microscopic pattern.

The composite microscopic surface rougness formed in this way is transferred to a metal by electrocasting, and, is further transferred to an optical material, thereby preparing a focusing screen.

Figure 21A:
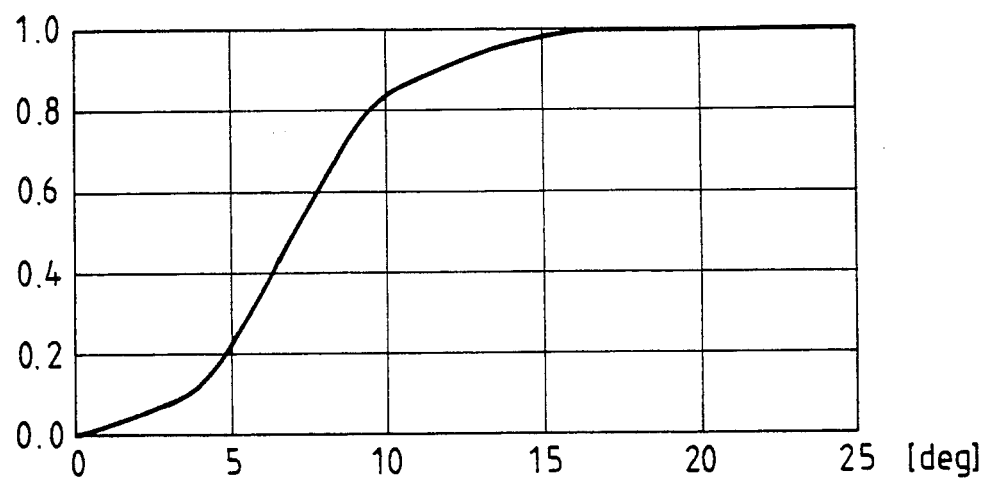
Figure 21B:
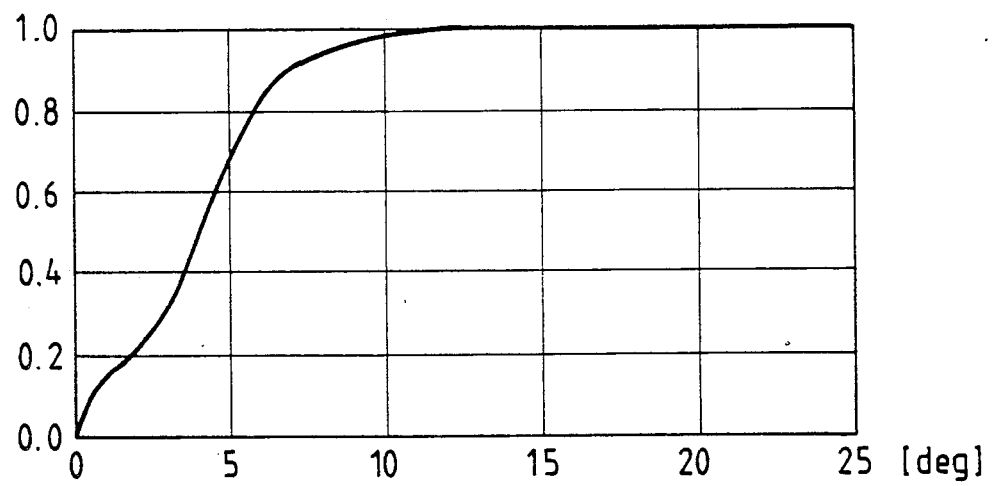

In the case shown in FIG. 18B, where a flat substrate is used, the focusing screen prepared from the focusing-screen matrix formed in the above-described manner exhibits a diffusion characteristic as shown in FIG. 21B, whereas, in the case shown in FIG. 18A, where a substrate in accordance with this invention is used, the focusing screen thus prepared exhibits a diffusion characteristic to be represented by the characteristic curve shown in FIG. 21A. A diffusion characteristic curve represents the ratio (vertical axis) of the quantity of light diffused within an angular range corresponding to an angle which is smaller than a certain angle (horizontal axis) to the total diffused light. Thus, as is obvious from the comparison between FIGS. 21A and 21B, using the matrix shown in FIG. 21A results in a relatively large quantity of large-angle diffusion light and a relatively small amount of small-angle diffusion light, which means this matrix provides a more desirable diffusion characteristic.

The randomness and the diffusion characteristic of the focusing screen obtained in the above embodiment can be varied in a desired manner by combining the configuration of the microscopic pattern on the master masking plate with the configuration of the microscopic surface roughness on the substrate in different ways. Further, in the same combination of the configuration of the microscopic pattern on the master masking plate and the configuration of the microscopic surface roughness on the substrate, the randomness and the diffusion characteristic can be varied by changing the film thickness of the photosensitive material applied to the substrate, the exposure, or the proximity gap ($\Delta d$). Thus, in accordance with this invention, a focusing screen exhibiting a variety in terms of randomness and diffusion characteristic an be produced, thus allowing selection of a desired focussing screen in terms of randomness and diffusion characteristic.

We claim:

1. In a focusing screen having of a multitude of micro-lens-like curved surfaces arranged on a given plane, wherein the improvement comprises:
    (a) that the arrangement pitch P of said multitude of micro-lens-like curved surfaces is a value which is in the range:

$8 \mu m \leq P \leq 30 \mu m$ (b) that the projection of the vertex of each of said multitude of micro-lens-like curved surfaces onto said plane is positioned at a periodical lattice point having plane coordinates (X, Y) determined from the following equations by using said pitch P and a pair of integers (I, J):

$X = P \times \{I + 0.25 \times (-1)^J\}$ $Y = P \times (J \times \sqrt{3}/2)$; and (c) that the distance between the vertex of each of said multitude of micro-lens-like curved surfaces and said plane varies within a certain variation range, which can be expressed as: $P \times H$ ($\mu m$), where H is a constant determined within the following range:

$0.01 \leq H \leq 0.1$.

2. The improvement according to claim 1, wherein said constant H is in the following range:

$0.015 \leq H \leq 0.08$.

3. The improvement according to claim 1, wherein the projection of the vertex of each of said multitude of micro-lens-like curved surfaces onto said plane deviates from said periodical lattice point by a predetermined distance, which can be expressed as: $P \times K$ ($\mu m$), where K is a constant that is in the following range:

$0 < K \leq 0.4$.

4. The improvement according to claim 3, wherein said constant K is in the range:

$0 < K \leq 0.3$.

5. The improvement according to claim 3, wherein the deviation of the projection of the vertex of each of said multitude of micro-lens-like curved surfaces onto said plane exhibits randomness with respect to said pair of integers (I, J).

6. The improvement according to claim 1, wherein the variation in the distance between the vertex of each of said multitude of micro-lens-like curved surfaces and said plane exhibits randomness with respect to said pair of integers (I, J).

* * * * *